(12) United States Patent  
Gautam et al.

(10) Patent No.: US 8,370,204 B2  
(45) Date of Patent: Feb. 5, 2013

(54) PROVIDING RELEVANT ADVERTISEMENTS AND SERVICE IN COMMUNICATION NETWORKS

(75) Inventors: Sandeep Gautam, Pune (IN); Janakiraman Senthilnathan, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 12/756,530

(22) Filed: Apr. 8, 2010

(65) Prior Publication Data

US 2010/0262472 A1    Oct. 14, 2010

Related U.S. Application Data

(60) Provisional application No. 61/168,088, filed on Apr. 9, 2009.

(51) Int. Cl.  
*G06Q 30/00* (2012.01)

(52) U.S. Cl. ............... 705/14.73; 705/14.4; 705/14.49; 705/14.55

(58) Field of Classification Search ............... 705/14.73, 705/14.49  
See application file for complete search history.

(56) References Cited

U.S. PATENT DOCUMENTS

| | | | | |
|---|---|---|---|---|
| 2009/0313241 | A1* | 12/2009 | Elsen | 707/5 |
| 2010/0174607 | A1* | 7/2010 | Henkin et al. | 705/14.53 |
| 2010/0191574 | A1* | 7/2010 | Ziemann | 705/10 |
| 2010/0272115 | A1 | 10/2010 | Ramankutty | |
| 2010/0312619 | A1* | 12/2010 | Ala-Pietila et al. | 705/14.1 |
| 2011/0040626 | A1* | 2/2011 | Lin | 705/14.63 |

OTHER PUBLICATIONS

White Paper, "Emerging Mobile Broadband Acess Gateways"; "Mobile Broadband Access Gateways: Bridging the Gap Between 3G and 4G Networks", Network Strategy Partners, LLC, Oct. 2008.*

* cited by examiner

*Primary Examiner* — Yehdega Retta

(74) *Attorney, Agent, or Firm* — Wilmer Cutler Pickering Hale and Dorr LLP

(57) ABSTRACT

In some embodiments, methods for providing advertisements from a communication gateway are providing, including: receiving a first request requesting content from a content server; analyzing the first request, including performing deep packet inspection; based on updatable profile information associated with a mobile node and on the analysis including the deep packet inspection, selecting an advertising category; based on the selected advertising category, retrieving an advertisement among a plurality of advertisements and sending the advertisement to the mobile node; updating the profile information to indicate the advertisement has been sent to the mobile node in response to the first request for content; receiving a second request for the content from the mobile node; retrieving the content; and in response to the second request and based on the profile information indicating the advertisement has been sent to the mobile node, sending the content to the mobile node.

19 Claims, 6 Drawing Sheets

PROVIDING RELEVANT ADVERTISEMENTS AND SERVICE IN COMMUNICATION NETWORKS

CROSS-REFERENCE TO RELATED APPLICATION

This application claims the benefit under 35 U.S.C. §119 (e) of U.S. Provisional Patent Application No. 61/168,088, filed Apr. 9, 2009, which is hereby incorporated by reference herein in its entirety.

FIELD OF THE DISCLOSURE

This disclosure relates to the field of telecommunications, and more particularly, to systems and methods for providing advertisements through inspection of data in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

The cost of accessing a wireless network can depend, e.g., on the network provider, a preset monthly allowance of data, the time of day at which network accesses occur, etc. In addition, different mobile users have different willingness to pay network access rates depending, e.g., on their interest in wireless services and economic situation. Some users may decline to use certain network services at all if they are required to pay for access to those services.

SUMMARY

Systems and methods are disclosed for providing advertising content to users based on data content that the users have attempted to access. A network device can enable a network provider to condition network access on a mobile user receiving advertisements relevant to data that the user has requested from the network. For example, the network device can redirect a request for data to an advertisement web server that the network device has determined as storing advertisements relevant to the requested data. After the user has viewed an advertisement from the advertisement server, the network device can grant the user access to the requested data. In addition, the advertisements can be served from a source that is unrelated to source of the requested data. For example, if a user requests data content from a web server providing sports scores, regardless of whether the web server has its own advertisements, the network device can determine what the requested data content contains and send the user advertisements for sports related clothes retrieved from advertisements servers of the network provider or third parties—the web server and companies managing or owning the web server being unaware that these advertisements are being sent to the user. By agreeing to receive advertisements relevant to the data the user requests, the network provider can offer the user a lower price for network access. For example, a user may agree to pay for voice access, but agree to have web access for thirty minutes without paying on the condition they he view a fifteen second advertisement relevant to the content of the first page he views during those thirty minutes.

Some embodiments provide methods for providing advertisements from a communication gateway, the methods including: receiving a first request for content from a mobile node, the first request requesting the content from a content server; analyzing the first request, including performing deep packet inspection on the first request; based on updatable profile information associated with the mobile node and on the analysis including the deep packet inspection, selecting an advertising category among a plurality of advertising categories; based on the selected advertising category, retrieving an advertisement among a plurality of advertisements from an advertisement server and sending the advertisement to the mobile node; updating the profile information to indicate the advertisement has been sent to the mobile node in response to the first request for content; receiving a second request for the content from the mobile node; retrieving the content from the content server; and in response to the second request and based on the profile information indicating the advertisement has been sent to the mobile node, sending the content to the mobile node.

Some embodiments provide methods for accessing network communications via an advertising-serving communication gateway, the methods including: sending a first request for content from a mobile node to the gateway, the first request requesting the content from a content server; receiving an advertisement at the mobile node, the advertisement selected based on its classification in an advertising category among a plurality of advertising categories based on analysis including deep packet inspection of the first request; sending a second request for the content from the mobile node to the gateway; and receiving the content at the mobile node from the gateway, in response to the second request for the content.

Some embodiments provide methods for supplementing a cost of wireless network access, the methods including:

establishing an advertising-based network communications plan with a mobile subscriber to provide network communications to a mobile node, wherein access to the network communications are conditional on the mobile subscriber agreeing to receive content-relevant advertisements as indicated in stored profile information of the mobile subscriber; receiving requests for content from the mobile node, the requests for content requesting content from remote content servers; based on the requests for content, the profile information, and the advertising-based network communications plan selecting the content-relevant advertisements from a plurality of potential advertisements available from advertising servers unrelated to the content servers; and sending the selected content-relevant advertisements and the requested content to the mobile node.

DETAILED DESCRIPTION

Systems and methods are disclosed to provide advertising content through inspection of data in a communication network. The inspection can be through content filtering of messaging or data packets. The content filtering can be provided by a network device, such as a gateway or chassis, which inspects the data content and can provide advertising content selected for a user. Content filtering can include, e.g., removing content, adding content, and modifying content. The network device can analyze information gathered from the messaging or packet data to assist in determining relevant advertising content. The advertising content can, e.g., then be displayed with the data content, inter-dispersed with the data content, or at periodic intervals amongst data content while the user is receiving data content. The advertising content can be provided by the network provider, e.g., as an additional revenue stream, to subsidize equipment provided to subscribers, or to subsidize the cost of using a mobile device, such as a media capable phone. The network provider can serve advertising, e.g., when a user accesses the network, by performing a search, accessing map-based directions, using email, or browsing the web, sending a text message (e.g., SMS), making phone calls, etc.

A gateway or chassis may be used to provide advertising content on a per-subscriber packet flow basis. A gateway is a device that spans networks such as an access network for wireless networks and a core network for Internet communications. A chassis is a physical device that can reside in a communication network to provide services or implement functions that are used on the communication network such as a serving gateway (SGW) or a packet data serving node (PDSN). The gateway or chassis can provide per-subscriber services such as enhanced charging, stateful firewalls, traffic performance optimization (TPO), content differentiated charging, per-subscriber stateful firewalls, and VPN service, for example, without requiring replacement of legacy access devices nor requiring multiple servers. The chassis can also provide the services "in-line" or within the session packet flow. An inline service is one that is provided at a network device where the packet flow is already passing so that the packet flow does not need to be diverted to another server to receive the service. In other embodiments, instead of using in-line services, the packet flow can be off-loaded to servers elsewhere in the communications network. The advertising can be provided in-line such that the inspection, provision of advertisements, and sending of combined advertising and data content can be provided by the same device and within the session packet flow. In the specification, the terms gateway and chassis are used interchangeably.

Figure 1:
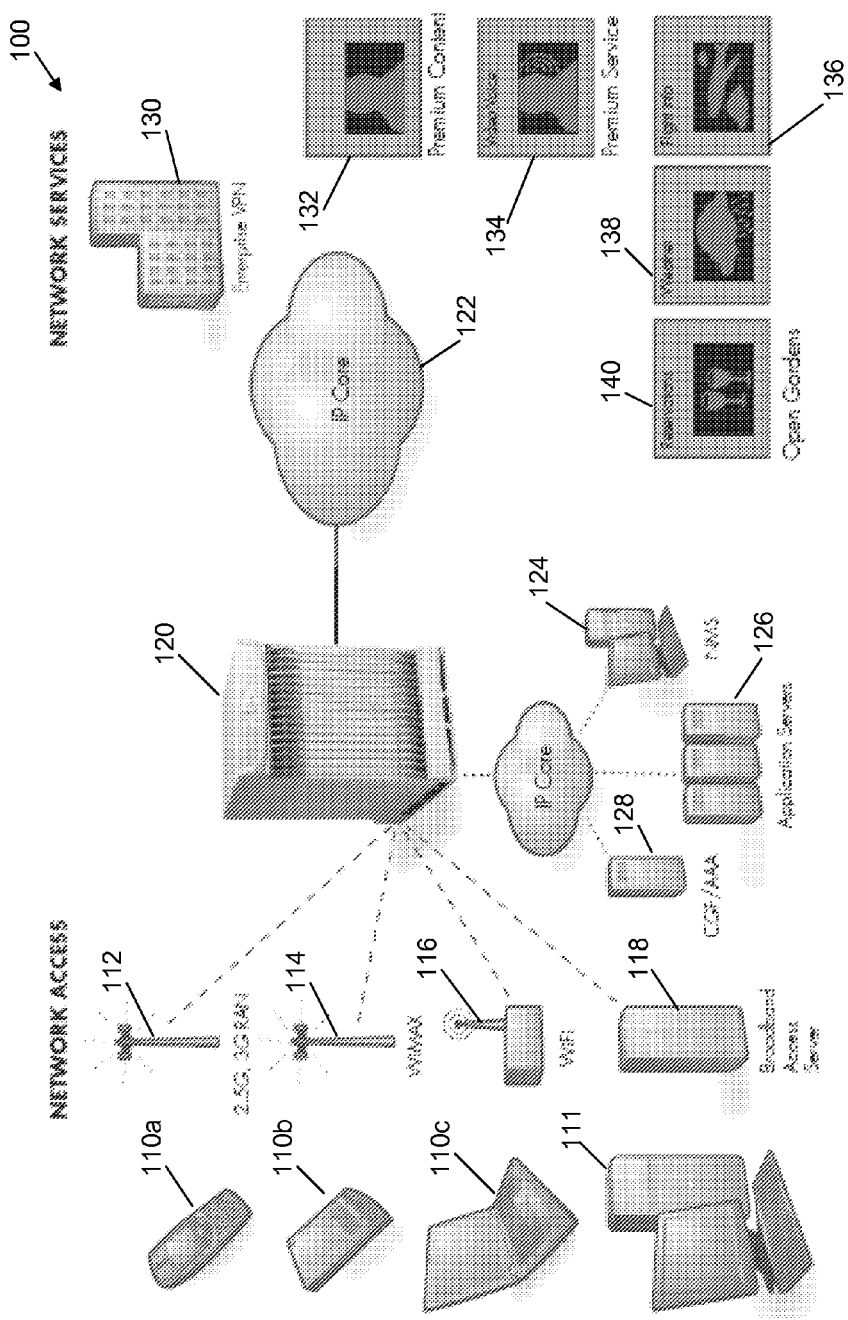
FIG. 1 illustrates a network diagram in accordance with certain embodiments.

FIG. 1 illustrates a network topology 100 that can deploy in-line services in accordance with some embodiments. Network topology 100 includes mobile nodes 110a-c computer 111, radio access network (RAN) 112, WiMAX 114, WiFi 116, broadband access server 118, gateway 120, IP core 122, network management system (NMS) 124, application servers 126, charging gateway function (CGF)/authentication, authorization, and accounting (AAA) 128, enterprise VPN 130, and services such as premium content 132, premium service 134, flight info 136, weather 138, and reservations 140. Gateway 120 can be used with multiple access technologies as shown. For example, RAN 112 can be 2nd generation (2G), 2.5 generation (2.5G), 3rd generation (3G) network capable, and can be a universal mobile telecommunications system (UMTS), a code division multiple access (CDMA) system, a global system for mobile communications (GSM) system, high packet data rate (HPRD) system, or any other applicable RAN technology. Also, because gateway 120 is subscriber aware, it can individually route subscriber session packet flows through or to the desired services, including an advertising service.

In certain embodiments, gateway 120 stores location-based information about mobile node 110a-100c or computer 111. The gateway can provide location information to application server 126, or use the location information itself, to provide relevant advertising information to the user. The location-based information such as a cell id, GPS tracking information, or other applicable geographic identifier, can be used by the gateway to request relevant geographically specific advertising in particular cases (e.g., for stores in the area, or the nearest location of a franchise). The location-based information can also be used to advertise near-by services related to the requested content. For example, if the subscriber is searching for restaurants in the area, the gateway can provide coupons for restaurants and offers for a movie or other compatible after dinner activities.

The gateway inspects data content sent and received by the mobile device of the subscriber using content filtering (CF). Content filtering is a service providing deep packet inspection of traffic passing through packet core network elements. These elements can include a packet data serving node (PDSN), a home agent (HA), and a gateway GPRS support node (GGSN) in 3G networks or serving gateway (SGW)/packet data network gateway (PGW) in 4G networks. The deep packet inspection that occurs can be specified based on a category or type of the requested content. This information about the content can be discovered by inspecting the uniform resource identifier (URI), for example, the wireless application protocol (WAP), or the hypertext transfer protocol (HTTP) URI. The content filtering can be implemented in a chassis that can redirect, replace, allow or block the content that is returned by the server and intercepted by the chassis. This service can be used in conjunction with end-subscriber internet plans, prepaid plans, and other plans for mobile devices. The content filtering allows setup of policies that regulate data content provided to a mobile device. For example, content filtering can be used to regulate web content based on considerations like age (verified in conjunction with age verification servers) or time of day restrictions (wherein one policy is active for some duration of day (e.g., school times), while another content filter policy is active for other time durations (e.g., nights)).

Network providers such as internet service providers (ISPs), mobile virtual network operators (MVNOs), and other operators of networks can provide advertising-subsidized data content plans with advertisements relevant to the content being browsed. The advertisements can be used, e.g., to subsidize the cost of network access, such as voice calls (e.g., voice over internet protocol (VoIP)) and texting (e.g., short message service (SMS)). The network element can build a subscriber database based on the content that is viewed by the user. This subscriber database can also be supplemented by subscriber input in some embodiments. For example, a subscriber can create or supplement a profile to receive more targeted advertising. The profile can include, e.g., information identifying the mobile user (e.g., name, home address, work address, age, sex, etc.) and preferences of the mobile user (e.g., would like to see adds related to sports, would not like to see adds related to clothes, etc.). The advertising can be provided as messages to the phone (e.g., video, text, picture, audio) or as web page content.

Information about the user's habits and/or preferences can also be logged and updates stored in a database. Some embodiments also tailor the ads based on the user's browsing practice, e.g., by monitoring and recording the types of content the user typically views or purchases the user typically makes and basing which ads are selected based on the recorded information.

In one embodiment, the relevancy of the ad can be ensured by aligning it with the same category/type, for example, as the uniform resource locator (URL) that the subscriber is trying to access. The advertisement can be presented along with information from the original URL or with a link to the URL that is presented, for example, at the bottom of the advertisement page. This embodiment allows for innovative subscription plans by the operator/ISP. The operator does not have to collaborate with the page content providers for advertising and instead can work directly with ad serving agencies like Google or establish their own ad servers with embedded ad databases.

A chassis can implement the content filtering for the purposes of serving ads, can store information regarding the subscriber, and serve relevant ads based on the deep packet inspection. The chassis can communicate with ad servers and servers such as authentication, authorization, and accounting (AAA) servers or home subscriber server (HSS) to cache subscriber information and advertisements to use in the provision of advertising services. The advertisement cache can be periodically refreshed to ensure a variety of advertising content is being used with the users.

An ad-based Internet plan can be implemented as follows. An end-subscriber having a content filtering policy or profile of, e.g., 'AD-ACTIVE' prompts the network element to initiate content filtering that redirects specified categories of URL accesses to one or more advertising-serving servers. In one embodiment, there are a number of categories provided by the content filtering functionality that can be used for ad serving. For example, approximately sixty-four content filtering categories can be redirected to a dedicated advertisement server for each category. The user can navigate or search for a restaurant, which will be detected in the food category. Location information can be used and the user is redirected to a server (e.g., www.food.adserver.com). This advertising server can then serve advertising to the user that is relevant to the content sought by the user and relevant to the user's location.

Figure 2:
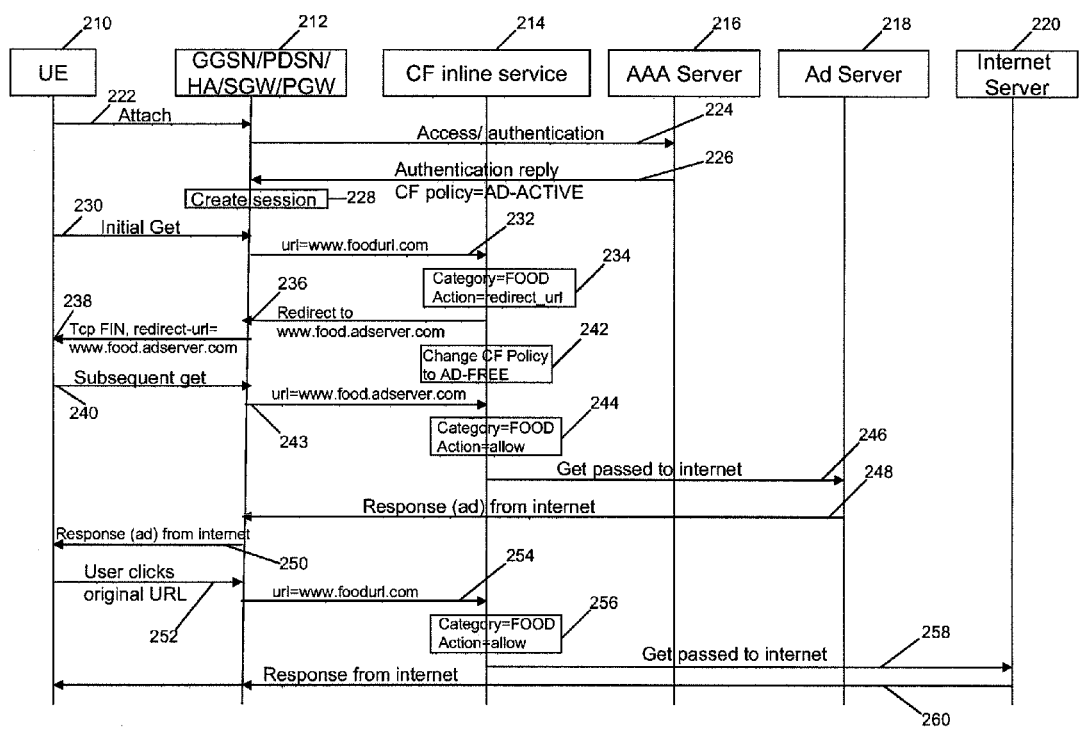
FIG. 2 illustrates a signaling diagram for advertising service in accordance with certain embodiments.

FIG. 2 illustrates an example of a signaling diagram for ad service in accordance with certain embodiments. FIG. 2 includes a mobile device such as user equipment (UE) 210, a gateway 212, a content filtering (CF) inline service 214, AAA server 216, advertising server 218, and internet server 220. The UE 210 first initiates a mobile internet connection with gateway 212, e.g., which can be a GGSN, an access gateway, a PDSN, a HA, a SGW, or a PGW. The connection can be setup by sending an attach message 222 to gateway 212. Gateway 212 sends an access/authentication message 224 to AAA server 216, which can be used to create a session and obtain access to the operator's network. A Radius/Diameter AAA message 226, such as an authentication reply, is used to push a content filter policy 'AD-ACTIVE' to gateway 212 in the initial authentication/authorization procedure. A session is created 228 on gateway 212 with the content filtering policy of 'AD-ACTIVE'. When the subscriber subsequently attempts to load a webpage, e.g., www.foodurl.com, that request (the initial GET 230) is sent to gateway 212 where the request and the URL is inspected using deep packet inspection (DPI) and its category is determined (e.g., to be food).

The deep packet inspection of the uniform resource locator (URL) www.foodurl.com 232 can be performed inline with a content filtering service. In FIG. 2, content filtering (CF) can be provided inline on the gateway with CF inline service 214. The content filtering can perform the deep packet inspection and determine the category to be food and provide a redirection url in 234. The CF inline service 214 can direct gateway 212 to redirect to an ad server page or to include ad content in the page that is served. Other actions can also be triggered by the content filtering. In some embodiments, the "AD-ACTIVE" subscriber profile residing in gateway 212 can include a rule that prompts the redirection of the request to an ad service if the request is determined to be in a category associated with a particular ad service that, e.g., provides ads for the category. Alternatively, the request can be fulfilled inline on the chassis implementing the content filtering. In redirecting the initial request to include ad content, the gateway 212 can send a transmission control protocol (TCP) FIN message 238 to UE 210 with the redirection URL www.food.adserver.com of the ad server (with the FIN flag indicating no more data).

The UE 210 terminates the old TCP connection and initiates a new TCP connection to the ad server. The GET request 240 to www.food.adserver.com passes through the gateway 212, which can perform, e.g., HTTP header enrichment on this GET message. For example, gateway 212 can insert header fields of initial requested URL www.foodurl.com and the category of the data content sought by the user to the ad server. The CF inline service, which can be implemented on gateway 212, can change the content filtering policy to AD-FREE in 242. When the URL www.food.adserver.com 243 is received at the CF inline server 214, the deep packet inspection can determine that the category is food, and allow the request to pass to the internet in 244 since the content filtering policy has been updated to AD-FREE. In 246, the URL www.food.adserver.com is passed to the internet and is received by ad server 218. The ad server 218 provides a responsive ad from the internet in 248. The responsive ad from the internet can be passed to the UE 210 in message 250. The ad content can also be combined with other information at gateway 212 in some embodiments (e.g., with ads from other sources, with information from the user's mobile subscriber, with account information of the user, etc.).

The user can proceed to the original url after receiving the advertising content and a get message 252 can include the original URL sent from UE 210. The URL is sent to the CF inline service 214 in message 254. The CF inline service 214 can determine the category is food and since the CF policy has been changed to AD-FREE, the CF inline service 214 allows the request to go onto the Internet in message 258. The Internet server 220 receives the URL in message 258 and provides a response in message 260.

In some embodiments, message 258 can be sent, e.g., immediately after message 232, but the response 260 can be delayed at gateway 221 until UE 210, e.g., receives ad 250. In other embodiments, message 260 and ad 250 can be delivered to UE 210 at the same time without the need for, e.g., messages 238, 240, or 252, by sending combined content to UE 210 that includes both message 260 and ad 250. In embodiments where message 260 and ad 250 are combined, they can be combined such that UE 210 cannot access the content of message 260 without viewing ad 250 (e.g., either at the same time or prior to accessing the content of message 260).

Figure 3:
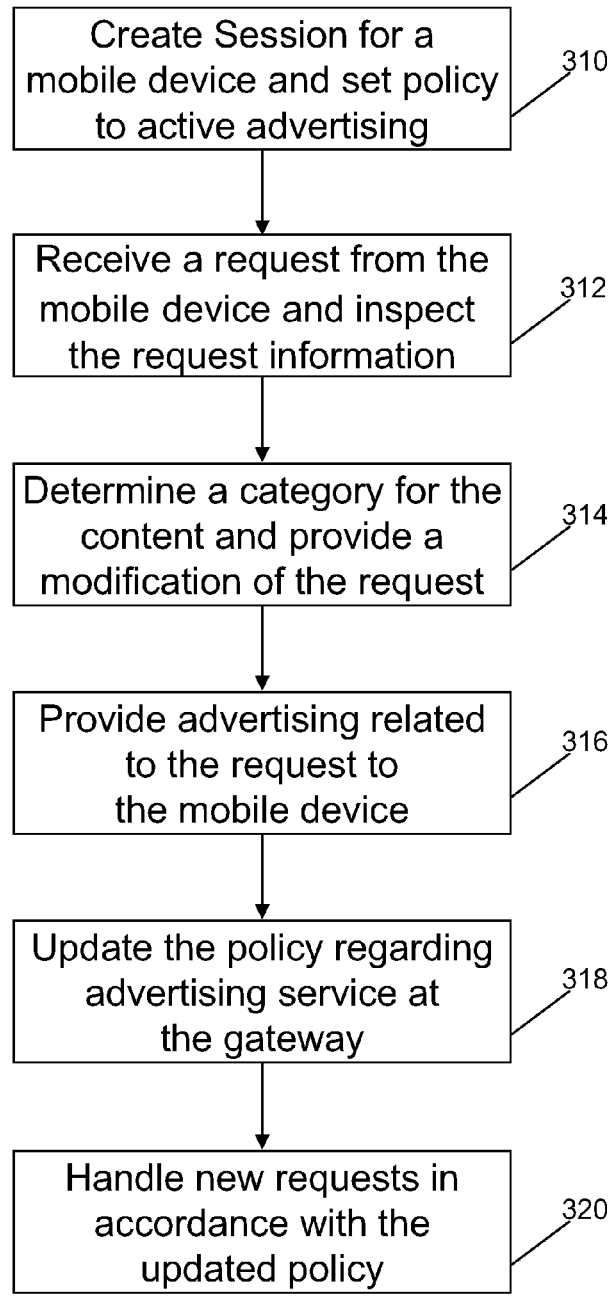
FIG. 3 illustrates a flow diagram for advertising service in accordance with certain embodiments.

FIG. 3 illustrates a flow diagram for implementing advertising service in accordance with certain embodiments. In 310, a session is created for a mobile device on the gateway and a policy for the session is set for an advertising display. Using the policy, advertising can be on a per user basis, which can allow a network operator to offer a range of plans or even offer advertising subsidized plans as a component of a spectrum of other plans. In 312, a request from the mobile device for service is received at the gateway. The request for service can be for a URL or other data content from the Internet. The gateway or a inline service on the gateway can inspect the request to determine how to handle the request. In 314, the gateway or inline service determines a category for the content request or determines there is no suitable category, and, e.g., modifies the request.

The modification of the request can include redirecting the request to an ad page, for incorporation of advertising in the desired content that is returned to the user, or redirecting or incorporating advertising at a later time, for example, when the user navigates to a second or third webpage. In 316, the advertising related to the content of the request or advertising selected by the advertising server, is provided to the mobile device. For example, if a category cannot be determined from the requested content, or a category does not exist, an advertising category can be selected at random or according to a selection algorithm, which tracks user's habits or previous purchases, for example. In 318, the policy regarding advertising service at the gateway can be updated to allow a certain amount of use, to update which advertisements have been displayed to a particular user, or any other type of update. In 320, the gateway handles new requests in accordance with the updated policy. For example, if the same URL is requested again, the URL can be displayed without showing another advertisement to the user.

As described below, in another embodiment, AAA server 216 can be used to direct policy at gateway 212. In this embodiment, the ad server provides the user an ad page with a link to the obtain the originally requested content. The ad server communicates with the Radius/Diameter server to change the policy of subscriber to 'AD-FREE', so that subscriber can browse the initial URL without being redirected again to the ad server. This can also be accomplished by looking at a database of recent URLs and determining repeats so the user is not served an advertisement in clicking on the ad or proceeding to the original URL. The ad server can interact with a Radius/Diameter server to ensure that a standard Change of Authorization (CoA) message with the new CF policy of 'AD-FREE' is pushed to the gateway handling that session for that subscriber. This changes the policy of the subscriber for the duration of that session to 'AD-FREE'; from the previous 'AD-ACTIVE'. The ad server can serve an ad page and also provide a link to the original URL in the ad page.

The user can then initiate a connection to the originally requested content by clicking on the link in the ad page. This request again goes through chassis and is deep packet inspected and content filtered. The category of the URL remains the same, e.g., FOOD, but the content filtering policy associated with subscriber has changed and has become 'AD-FREE'. The 'AD-FREE' profile has a rule that allows access if the category is FOOD. Thus, this time the access is allowed to pass through and reach the internet without redirection at the gateway. The server, e.g., www.foodurl.com, responds to the URL request and the response is allowed to pass through the gateway and reach the mobile device.

Other embodiments are also possible using the gateway implementing a network element (e.g., GGSN/PDSN/HA/SGW/PGW). In some embodiments, after a specified period of time, the Radius/Diameter server pushes the content filtering policy back to 'AD-ACTIVE' for the session so that the user is again sent advertisements. For example, after an hour, the Radius/Diameter server pushes the CF policy 'AD-ACTIVE' for the subscriber, thus ensuring that a relevant ad is shown with a specified frequency to the end-subscriber. In another embodiment, the Radius/Diameter server is de-coupled from the ad server and the chassis locally manages activation and deactivation of the content filtering policies 'AD-FREE' and 'AD-ACTIVE'. Thus, when the subscriber initially establishes the session (e.g., to obtain data content from the network), his policy is 'AD-ACTIVE' and every time a URL hits a category in the 'AD-ACTIVE' profile, the URL access is redirected to an appropriate AD server, and the content filtering policy of the user is then changed to 'AD-FREE'.

In some embodiments, the ad server can be implemented to analyze the URL (e.g., www.foodurl.com) and present appropriate ads to the subscriber (e.g., food ingredients if www-.foodurl.com is a webpage about cooking, or restaurant pages if www.foodurl.com is a web page about restaurants). The analysis can be implemented in the ad server or the chassis by associating a number of key words with an advertisement or category and analyzing the data content for matches with the advertising or category. The top category can be chosen based on a key word hits algorithm that ranks the top categories by using the most matches. The number of hits between the advertisements and the data content can provide a listing of the most relevant advertisements. One of the top ads can then be selected randomly for presentment to the user. For example, the top eight advertisements can be compiled in a list and one of the eight can be selected for presentment to the user. Another enhancement is to add the logic of the physical location of the subscriber by taking into consideration any signaling attributes that convey this information to the chassis function (e.g., a GGSN/PDSN/HA/SGW/PGW). This allows the ad server to serve ads for local restaurants based on the location of the subscriber who submitted the FOOD URL.

In some embodiments, instead of enabling a different content filtering policy, e.g., 'AD-FREE' after redirection to AD server, the content filtering can instead be disabled for the subscriber for a period of time or based on events. This can allow an increase in system performance because resources are not used. For example, if the network is having trouble meeting the quality of service requirements of a large number of users, the sending of advertisements could be temporality suspended to free network resources. User profile information can be analyzed, and users which often act on ads can be selected to continuing receiving ads, while users who seldom act on ads can be selected not to receive ads. Such selection based on users's prior action can allow the network operator to reduce the amount of revenue that may be lost by not sending ads to users.

In some embodiments, the trigger to 'AD-ACTIVE' can be time based, event based, or both. For example, advertisements can be served on a periodic basis during use or after a certain period of time has elapsed since the last ad was served and based on events such as a new session is started, a mobile device is active after a period of idle, based on IP addresses of where the data content is obtained, or based on an analysis of the data content itself. For example, when analyzing the data content itself, a transition from looking for a restaurant to looking for a theater show can be detected and a new advertisement can be served.

In certain embodiments, instead of performing the header enrichment of the redirected GET request to www.food.adserver.com as mentioned above, the network element can construct a new redirect URL and embed the original URL and content filtering category. This constructed redirected URL can be returned to the mobile device. Thus, the redirect URL can look like www.food.adserver.com.?url=www.food.com&&category=FOOD, which is sent to the ad server. By sending the information in the URL, the ad server becomes aware of both the original URL and category of the original URL. The ad server can now serve the ad page as before with the original URL embedded as a link in the ad page.

As discussed above, the advertising service and content filtering can be provided in-line by a chassis that provides services and functions (e.g., PDSN/GGSN/PGW). In some embodiments, the chassis can set up a session by inspecting the information in signaling protocols such as RADIUS-accounting, DIAMETER, GPRS tunneling protocol (GTP), and Mobile IP (MIP), for example. The chassis can extract (or sniff) an IP-address assigned to the mobile device, a network access identifier (NAI), international mobile subscriber identity (IMSI), mobile subscriber identification (MSID), correlation-ID (for CDMA implementations), user data record (UDR), event data records (EDR), calling-station-ID, and/or any other applicable information. The extracted information is used in setting up a session for the mobile device and can be cached in the chassis. The extracted information may be cached in a table or other data structure to provide quick lookups based on one of the values, such as IP address. The extracted information can be used to determine the subscriber and can link the extracted information with a subscriber profile. This allows the chassis or gateway to provide subscriber awareness to IP packets entering and leaving the gateway and be able to redirect these packets to the services identified by the subscriber profile. The subscriber awareness allows the network element to trigger the serving of advertisements if a subscriber has signed up for this service.

Figure 4:
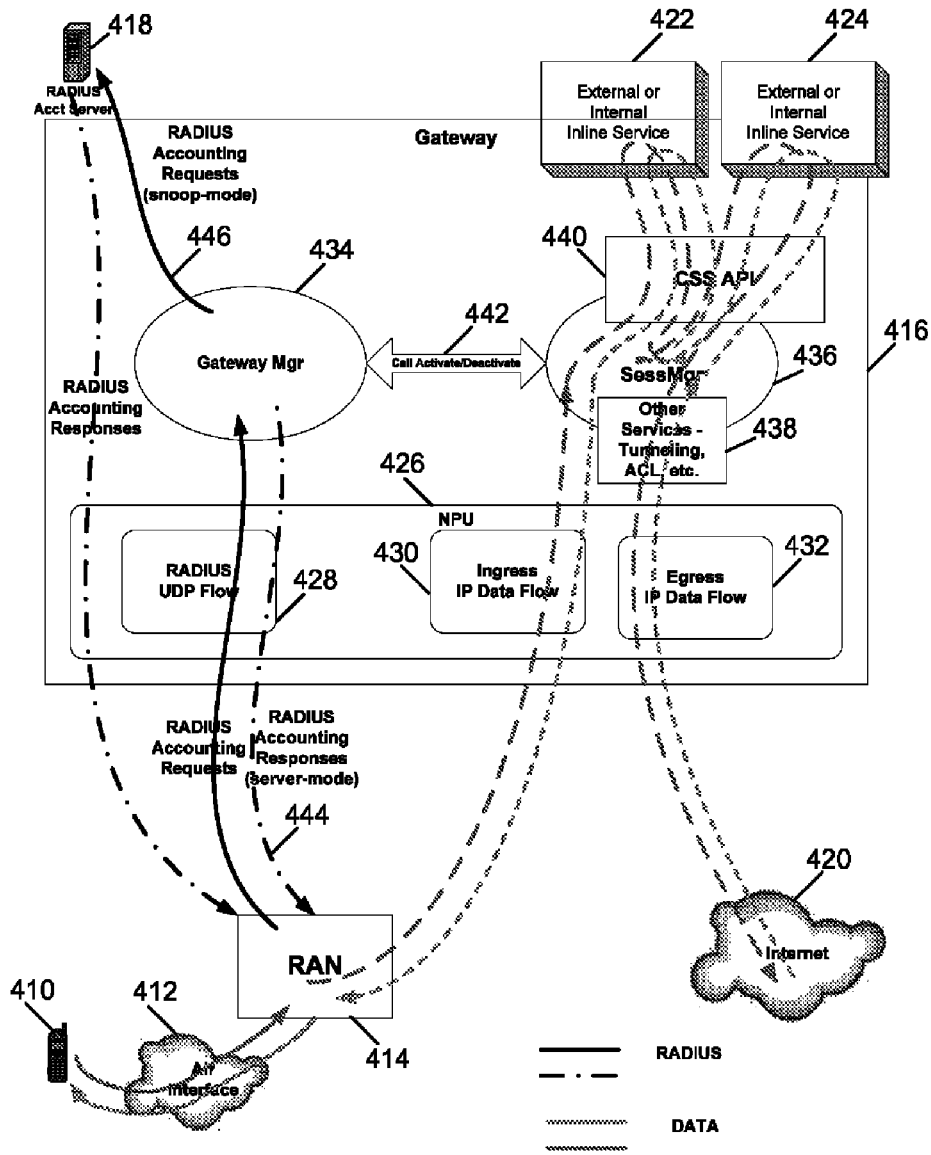
FIG. 4 illustrates a chassis implementing advertising service in accordance with certain embodiments.

FIG. 4 illustrates packet flows through a gateway in accordance with some embodiments. FIG. 4 includes a mobile device 410, an air interface 412, a radio access network (RAN) 414, a gateway (which can be any of the following: access gateway/GGSN/HA/PDSN/PGW/SGW) 416, a radius account server 418, an Internet 420, and an external or internal in-line service 422 and 424. Gateway 416 includes network processing unit (NPU) 426, RADIUS UDP flow 428, ingress IP data flow 430, egress IP data flow 432, gateway manager 434, session manager 436, other services module 438, content service steering (CSS) application program interface (API) 440, and module communication 442. RADIUS UDP flow 428, ingress IP data flow 430, egress IP data flow 432, gateway manager 434, and session manager 436 can be implemented in software and can be used to provide the services to a packet flow. RADIUS UDP flow 428 can be used by gateway manager 434 to monitor RADIUS flows destined to a RADIUS accounting server 418. This can be implemented by monitoring a specified port number for receiving the RADIUS accounting requests sent by RAN 414.

The RADIUS accounting requests are received by the gateway manager 434 for processing. The gateway manager 434 inspects the accounting messages to activate and deactivate sessions in gateway 416. During the inspection of the accounting messages by gateway manager 434, information is also obtained that can be used to setup the session, authenticate the session, and link the session to a subscriber profile. This information can be sent to session manager 436 through module communication 442, which may be implemented in any combination of hardware or software. Gateway manager 434 can setup one or more RADIUS UDP flows 428 corresponding to the UDP port numbers used by the RAN 414 when communicating to a RADIUS accounting server 418.

Gateway manager 434 functions in at least two modes relating to the handling of RADIUS accounting messages received from access equipment. In some embodiments, gateway manager 434 is in a server mode. In server mode, the RADIUS accounting messages are addressed to gateway 416 and gateway manager 434 issues RADIUS accounting responses 444, with gateway 416 implementing a RADIUS server. In other embodiments, gateway manager 434 is in an inspect mode and the messages are not addressed to the gateway, so the messages are directed to the gateway manager 434 by NPU 426. At gateway manager 434, the messages are inspected and information is extracted before the message is forwarded 446. In both modes, the messages are inspected and information is extracted and sent to session manager 436. Gateway manager 434 can inspect RADIUS accounting start and stop messages to activate and deactivate sessions by way of communication module 442. The gateway manager 434 can also deliver a stripped copy of the original RADIUS packet to any in-line service that uses accounting information for charging purposes. In certain embodiments, session manager 436 can modify the packet flows inserting charging information with the packets while a CSS API 440 directs the packets through in-line services and then strips this information afterwards.

Session manager 436 can create at least two IP data flows 430 and 432. Ingress IP data flow 430 indicates to session manager 436 that the packet is coming from mobile node 410 so that session manager 436 can direct the packet to the corresponding functions or servers for processing the packet in accordance with the services in the subscriber profile. When a packet arrives at egress IP data flow 432, a similar process takes place. Egress IP data flow 432, like ingress IP data flow 430, recognizes packets on a subscriber session basis and forwards the packets to session manager 436 for service processing in accordance with the subscriber profile. Session manager 436 may add additional IP data flow modules per session if other services such as tunneling are applied to the session on the egress side, for example. When a new session is activated and session manager 436 receives the extracted information from gateway manager 434, session manager 436 can authenticate the call to load the subscriber profile. The authentication can involve the NAI, the MSID, the user name and password, or any other authentication attribute of mobile node 410. The subscriber profile includes configuration information such as the subscriber plan, the advertisements recently served, browsing history, and other services applied for this subscriber. When the call is authenticated or authorized, then the routing on a per-session basis is setup and data flow begins.

The subscriber ACL is a set of rules associated with a subscriber, such as which services are to be performed on packets, such as content filtering to provide advertising. The subscriber ACL can be processed in software by session manager 436 that process the packet flow for the subscriber session. In some embodiments, the subscriber ACL is bound to one or more in-line services and CSS API 440 is used to direct packet to and from the in-line services, which can include external servers. The in-line service includes an ad server, which can receive a URL request to serve advertising to mobile device 410 as described above. CSS API 440 is a module that defines how packet flows are handled by the gateway based on the content of the packets, which includes information in a packet header. The content service steering (CSS) API 440 includes features such as load balancing, network address translation (NAT), HTTP redirection (e.g., to an ad server), and DNS redirection. In some embodiments, the CSS API 440 uses information obtained from the subscriber profile to both select appropriate content service providers (e.g., the in-line service or external content server) and route the packet flows in a load balanced fashion. The load balancing can be accomplished by a number of algorithms such as round robin, least loaded, destination hashing, and normalized response time monitoring. The CSS API 440 can also monitor the health of external servers through internet control message protocol (ICMP), hypertext transfer protocol (HTTP), transfer control protocol (TCP), and file transfer protocol (FTP) keep-alive mechanisms. By monitoring the health of external servers, the CSS API 440 can redirect packet flows if an external server fails.

Figure 5:
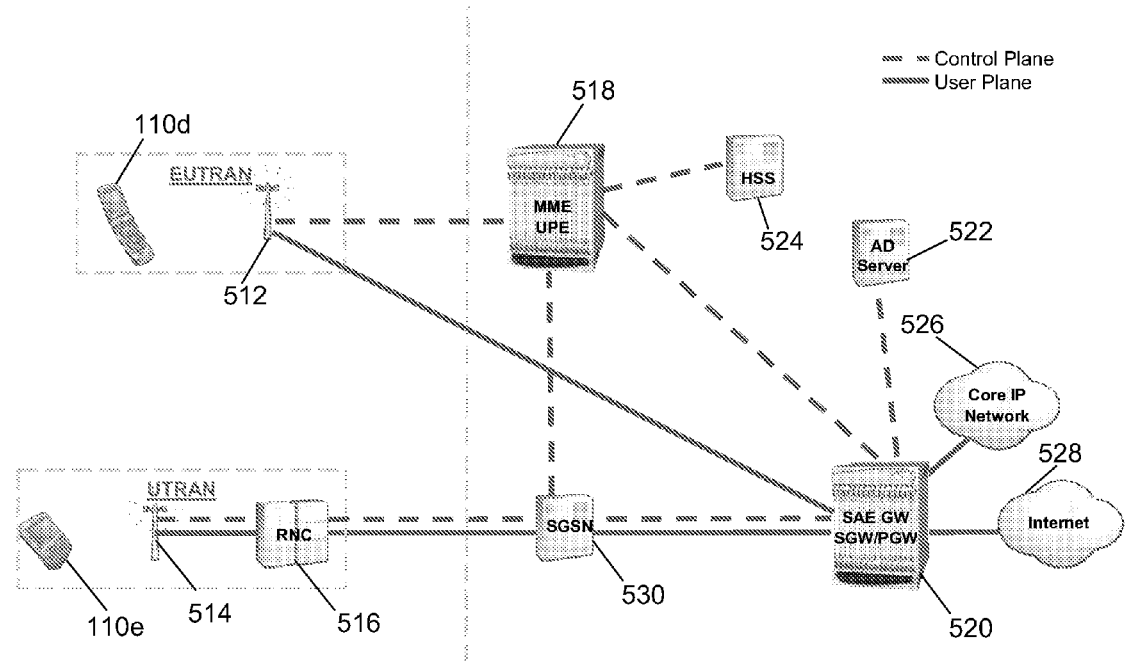
FIG. 5 illustrates a network diagram in accordance with certain embodiments.

FIG. 5 illustrates an implementation in a long term evolution (LTE) network in accordance with certain embodiments. FIG. 5 illustrates both a universal mobile telecommunication system (UMTS) release 8 network and a LTE network. The network diagram of FIG. 5 includes user equipment (UE) 110d and 110e, an evolved nodeB (eNB) 512, a nodeB 514, a radio network controller (RNC) 516, a mobility management entity (MME)/user plane entity (UPE) 518, a system architecture evolution gateway (SAE GW) 520, advertising server 522, home subscriber server (HSS) 524, core IP network 526, internet 528, and Serving General packet radio service Support Node (SGSN) 530. The MME 118, SAE GW 520, and SGSN 530 can be implemented in a chassis as described below. The SAE GW 520 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 518 is a control-node for the LTE access network. The MME 518 is responsible for UE tracking and paging procedures including retransmissions. MME 518 handles the bearer activation/deactivation process and is also responsible for choosing the SGW for a UE at the initial attach and at time of an intra-LTE handover. The MME 518 also authenticates the user by interacting with the HSS 524. The MME 518 also generates and allocates temporary identities to UEs and terminates Non-Access Stratum (NAS) signaling. The MME 518 checks the authorization of the UE to camp on the service provider's Public Land Mobile Network (PLMN) and enforces UE roaming restrictions. The MME 518 is the termination point in the network for ciphering/integrity protection for NAS signaling and handles the security key management. Lawful interception of signaling is also supported by the MME 518. The MME also provides the control plane function for mobility between LTE and 2G/3G access networks with the S3 interface terminating at the MME 518 from the SGSN 530. The MME 518 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception. The P-GW provides connectivity to the UE to external packet data networks by being the point of exit and entry of traffic for the UE. A UE may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO). The SGW or the PGW depending on the embodiment, can be used to provide deep packet inspection and provide advertising to the user on a per subscriber basis as described above on a chassis implementing a SGW or a PGW. The SGW or PGW can communicate with ad server 122 to send and receive advertising content relevant to the user's data content request.

The chassis described above can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 6:
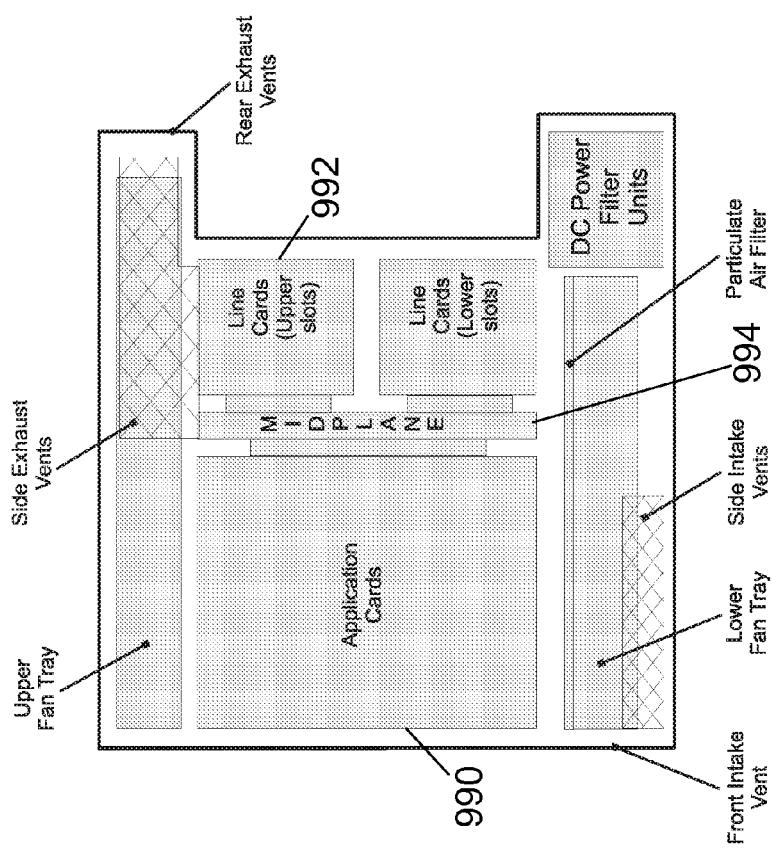
FIG. 6 illustrates a chassis in accordance with certain embodiments.

The features of a chassis that implements a gateway, in accordance with some embodiments, are further described below. FIG. 6 illustrates positioning of cards in the chassis in accordance with some embodiments. The chassis includes slots for loading application cards 990 and line cards 992. A midplane 994 can be used in the chassis to provide intrachassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for providing advertisements from a gateway, the method comprising:
    establishing a communication session between a gateway and a mobile node in response to receiving at the gateway a message from the mobile node, wherein the gateway is in communication with a wireless access network for providing access to one or more packet data networks;
    receiving at the gateway a first request for content from the mobile node, the first request requesting the content from a content server;
    analyzing the first request at the gateway by performing deep packet inspection on the first request;
    based on updatable profile information associated with the mobile node and on the deep packet inspection, selecting at the gateway an advertising category among a plurality of advertising categories;
    based on the selected advertising category, retrieving at the gateway an advertisement among a plurality of advertisements from an advertisement server and sending the advertisement to the mobile node;
    updating the profile information to indicate the advertisement has been sent to the mobile node in response to the first request for content;
    receiving at the gateway a second request for the content from the mobile node subsequent to sending the advertisement to the mobile node;
    retrieving at the gateway the content from the content server in response to the second request; and
    in response to the second request and based on the profile information indicating the advertisement has been sent to the mobile node, sending from the gateway the content to the mobile node.

2. The method of claim 1, wherein the profile information includes user preferences and user identification information.

3. The method of claim 1, further comprising:
    sending from the gateway a redirection message to the mobile node directing the mobile node to send to the gateway a request for the advertisement; and
    receiving at the gateway the request for the advertisement from the mobile node, wherein the retrieving of the advertisement from the advertisement server is responsive to the request for the advertisement from the mobile node.

4. The method of claim 1, wherein the retrieving the advertisement comprises sending the selected advertising category to the advertisement server and receiving the advertisement from the advertisement server.

5. The method of claim 1, wherein the first request for content comprises a uniform resource identifier and the content comprises at least one of a web page, a HyperText Markup Language file, a Wireless Access Protocol page, and a Wireless Markup Language file.

6. The method of claim 1, further comprising crediting an account of a user associated with the mobile device based on the user authorizing the sending of the advertisement to the mobile node.

7. The method of claim 1, wherein the second request comprises acknowledgement that the mobile device has received the advertisement and at least one of having displayed the advertisement or is displaying the advertisement.

8. The method of claim 1, further comprising selecting the advertising server among a plurality of advertising servers based on the selected advertising category.

9. The method of claim 1, further comprising setting a content filtering policy associated with the communication session to AD-ACTIVE at the gateway when the communication session is established, wherein the AD-ACTIVE content filtering policy enables the selecting the advertising category and the retrieving and sending the advertisement.

10. The method of claim 1, further comprising setting the content filtering policy to AD-FREE at the gateway after sending the advertisement to the mobile node, wherein the AD-FREE content filtering policy disables selecting an advertising category and retrieving and sending an advertisement.

11. The method of claim 1, further comprising establishing an advertising-based network communications plan with a subscriber of the mobile node, wherein access to network communications is conditional on the subscriber agreeing to receive content-relevant advertisements as indicated in the profile information of the mobile node.

12. A gateway in communication with a wireless access network, comprising:
    a memory residing in the gateway for storing updatable profile information of one or more mobile subscribers; and
    a processing unit residing in the gateway in communication with the memory,
    wherein the gateway is in communication with a wireless access network for providing access to one or more packet data networks and
    wherein the processing unit is configured to:
        establish a communication session between the gateway and a mobile node upon receiving a message from the mobile node;
        receive a first request for content from the mobile node, the first request requesting the content from a content server;
        perform deep packet inspection on the first request;
        select an advertising category among a plurality of advertising categories based on the updatable profile information associated with the mobile node subscriber and on the deep packet inspection;
retrieve an advertisement among a plurality of advertisements from an advertisement server based on the selected advertising category;
send the advertisement to the mobile node;
update the updatable profile information of the mobile node subscriber to indicate that the advertisement has been sent to the mobile node in response to the first request for content;
receive a second request for the content from the mobile node subsequent to sending the advertisement to the mobile node;
receive the content from the content server in response to the second request; and
send the content to the mobile node in response to the second request and based on the profile information indicating that the advertisement has been sent to the mobile node.

13. The gateway of claim 12, wherein the processing unit is further configured to:
send a redirection message to the mobile node directing the mobile node to send a request for the advertisement; and
receive the request for the advertisement from the mobile node, wherein the processing unit retrieves the advertisement from the advertisement server in response to the request for the advertisement from the mobile node.

14. The gateway of claim 12, wherein the processing unit retrieves the advertisement from the advertisement server by sending the selected advertising category to the advertisement server and receiving the advertisement from the advertisement server.

15. The gateway of claim 12, wherein the second request comprises acknowledgement that the mobile node has received the advertisement and at least one of having displayed the advertisement or is displaying the advertisement.

16. The gateway of claim 12, wherein the processing unit is further configured to offer to the mobile node subscriber to enroll in an advertising-based network communications plan.

17. The gateway of claim 12, wherein the processing unit is further configured to set a content filtering policy associated with the communication session to AD-ACTIVE when the communication session is established, wherein the AD-ACTIVE content filtering policy enables the processing unit to select the advertising category and retrieve and send the advertisement.

18. The gateway of claim 12, wherein the processing unit is further configured to set the content filtering policy to AD-FREE after sending the advertisement to the mobile node, wherein the AD-FREE content filtering policy prevents the processing unit from selecting an advertising category and retrieving and sending an advertisement.

19. Logic encoded in one or more tangible media that includes code for execution and when executed by a processor is operable to perform operations comprising:
establishing a communication session between a gateway and a mobile node upon receiving at the gateway a message from the mobile node;
receiving at the gateway a first request for content from the mobile node, the first request requesting the content from a content server;
analyzing the first request at the gateway by performing deep packet inspection on the first request;
based on updatable profile information associated with the mobile node and on the deep packet inspection, selecting at the gateway an advertising category among a plurality of advertising categories;
based on the selected advertising category, retrieving at the gateway an advertisement among a plurality of advertisements from an advertisement server and sending the advertisement to the mobile node;
updating the profile information to indicate the advertisement has been sent to the mobile node in response to the first request for content;
receiving at the gateway a second request for the content from the mobile node subsequent to sending the advertisement to the mobile node;
retrieving at the gateway the content from the content server in response to the second request; and
in response to the second request and based on the profile information indicating the advertisement has been sent to the mobile node, sending from the gateway the content to the mobile node.

* * * * *